Magnus Björndal
Inventor

Feb. 23, 1937.  M. BJÖRNDAL  2,071,607
ELECTRIC HYDROMETER
Filed Dec. 13, 1933   2 Sheets-Sheet 2
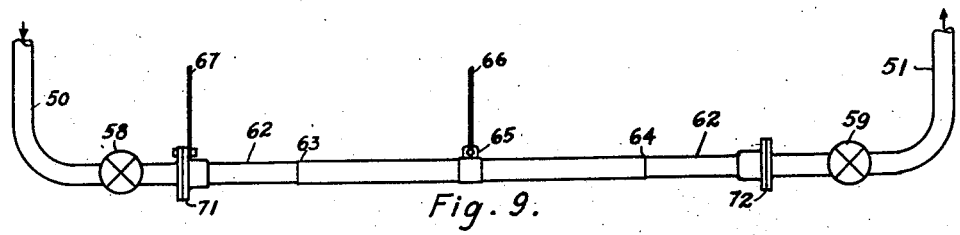
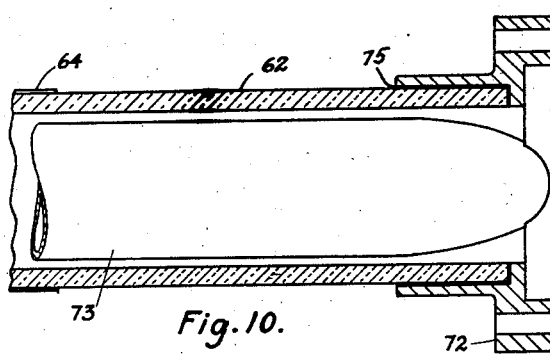
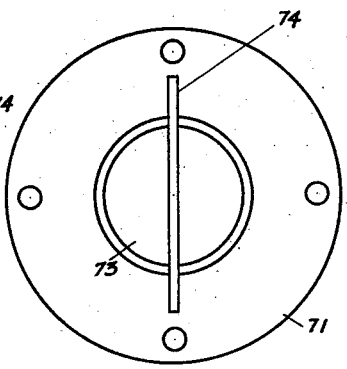
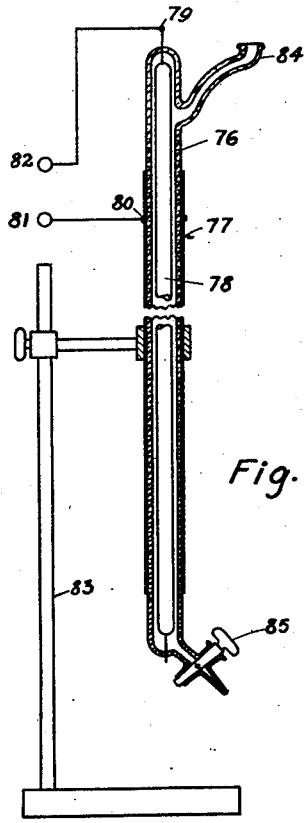
Magnus Björndal
Inventor.

Patented Feb. 23, 1937

2,071,607

UNITED STATES PATENT OFFICE 2,071,607

ELECTRIC HYDROMETER

Magnus Björndal, Jersey City, N. J.

Application December 13, 1933, Serial No. 702,122

5 Claims. (Cl. 175—183)

The present invention relates to a new electric method and apparatus for the determination of the amount of water in solution with other liquids such as alcohols, acetic acid, acetone, ammonia, amyl acetate, anilin, benzol (benzene), bromine, carbon bisulphide, carbon dioxide, chlorine, nitrous oxide, sulphur dioxide, etc. The main objects of my invention are:

*First:*—To provide an accurate instrument for the quick determination of alcohol in all types of watery solutions, specifically such as beers, wines and liquors.

*Second:*—To provide a precision instrument for continuous or intermittent direct reading of the percentage of alcohol in watery solutions.

*Third:*—To provide a precision instrument for continuous recording of the percentage of alcohol in watery solutions.

*Fourth:*—To provide an instrument for the rapid determination of the percentage of water in solution with various hydrocarbons and other liquids such as those mentioned above.

Other objects of my invention will be evident from the following specification and claims.

I attain the objects mentioned by utilizing as a basis for my instrumentation the fact that water has an extremely high dielectric constant. The dielectric constant, also called the specific inductive capacity, is defined as the ratio of the capacity of a condenser with a given substance as dielectric to the capacity of the same condenser with air or vacuum as dielectric. This ratio for water is 81.07 at 18° C., while for ethyl alcohol it is 25.8 at 20° C. Any mixture of these two liquids, therefore, will vary linearly between these two limits. My apparatus thus consists simply of a method for determination of the dielectric constant of any mixture of two such components as water and alcohol. Due to the proportionality of the measured results the instruments may be calibrated to read directly the percentage of one of the components.

The methods and means for obtaining these objects are illustrated in the accompanying drawings, where—

Fig. 9 is an outline of the actual mechanical pipe and condenser arrangement for the measurement of continuous flow as indicated schematically in Fig. 7.

Fig. 10 is a section of one end of a preferred design of measuring condenser for continuous flow.

Fig. 11 is an end elevation of the condenser shown in Fig. 10.

Fig. 12 is an outline and section of a preferred type of laboratory condenser for the measurement of samples.

Figure 1:
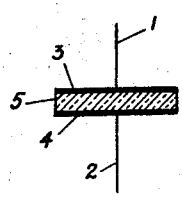
Fig. 1 is a schematic diagram of a simple condenser with a single dielectric.

In Fig. 1 is shown a simple parallel plate condenser where 1 and 2 are the electrical conductors leading to the apparatus, 3 and 4 are the plates and 5 is the dielectric. It is well known that the formula for the capacity of such a condenser is:

$$C = \frac{kA}{3.6\pi d} \text{ micro-micro farad} \tag{1}$$

Where $k$ is the dielectric constant, $A$ the area of the condenser, and $d$ the distance between the two plates 3 and 4.

Figure 2:
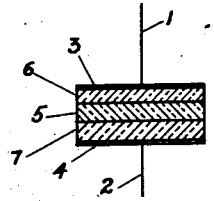
Fig. 2 is a schematic diagram of a condenser with a dielectric consisting of three layers of different materials.

In Fig. 2 is shown a similar parallel plate condenser as shown in Fig. 1, but in the present case the condenser has three layers of different dielectrics, 5, 6 and 7. This is the case which is most practical in measurements of the type herein described as it is thus possible to insulate the electrodes, or plates 3 and 4 by the dielectrics 6 and 7 while the remaining dielectric 5 is the one to be measured. The formula for this arrangement of a parallel plate condenser is:

$$C = \frac{A}{3.6\pi(d_1/k_1 + d_2/k_2 + d_3/k_3)} \text{ micro-micro F.} \tag{2}$$

Where the subscripts 1, 2 and 3 denote respectively the distance between or thickness of each layer and the dielectric constant of the three layers 5, 6 and 7. This feature has a very important bearing upon the practicability of the present measurements. This is due to the fact that were bare condenser plates to be used the liquid could not be measured as a pure dielectric. Certain liquids would at times show a considerable conductivity which would make a balancing of the bridge circuit difficult and a correct calibration, in terms of one or the other of the components, impossible. Bare electrodes would also be inadvisable due to corrosion and collection of possible suspended protein or other particles which may be present in the liquid. Both these effects would tend to destroy the accuracy of the measurements. It may be noted from the formula for this arrangement that the effect of the introduction of one or two additional dielectric layers is in general to cut down the capacity of the condenser. However, by choosing suitable dielectrics for insulation and by using the best proportions of thickness it is always possible to get a condenser where the capacity of the liquid to be measured is preponderating. Another important factor in the accuracy of these measurements is temperature. Every dielectric has what is commonly called a temperature coefficient of capacity, i. e. its dielectric constant will change considerably according to changes in temperature. To avoid difficulties of this nature it is in most cases necessary to apply a constant temperature bath or some means of temperature regulation keeping the measured fluid inside certain limits of temperature.

Figure 3:
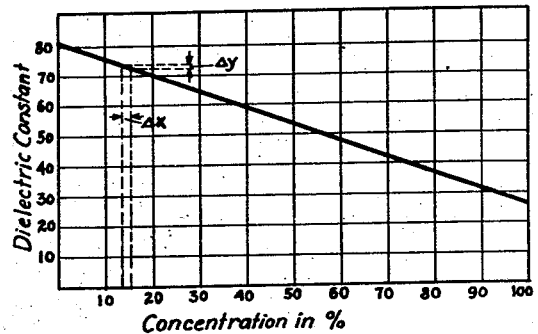
Fig. 3 shows graphically the relation between concentration in per cent and dielectric constant in solutions of alcohol and water.

In Fig. 3 is shown graphically how the dielectric constant of a mixture of water and alcohol changes with the concentration. The dielectric constant being laid off along the vertical ordinate while the concentration in per cent is laid off along the horizontal abscissa. In measuring the properties of a slightly variable mixture the procedure consists in determining electrically, as shown below, a certain increment change $\Delta y$ in the dielectric constant which again corresponds to an increment change $\Delta x$ in the concentration. Due to the simple proportionality of these factors the indicating instruments can easily be calibrated to read directly in percentage of one or the other of the two components. Where a mixture consists of three components and one, for example water, is preponderating it would be possible to measure the water content, but the calibration would be more difficult and the result more inaccurate.

Figure 4:
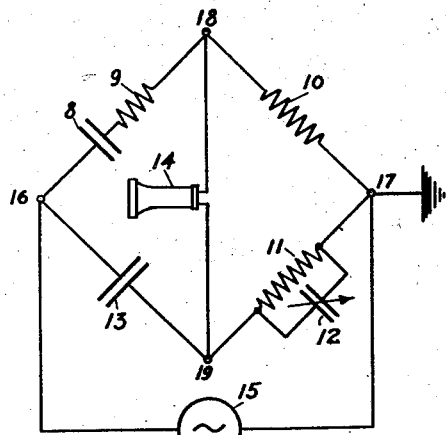
Fig. 4 is a schematic diagram of a special bridge circuit which is quite convenient for the measurement of capacitance in the laboratory.

In Fig. 4 is shown the schematic diagram of a special bridge circuit, known as the Schering bridge, which is eminently suitable for the measurement of small capacitances. In this circuit 8 is the unknown condenser, 9 its series resistance, 10 a resistor non-inductively wound and preferably variable, 11 is another non-inductive resistor shunted by a variable condenser 12, 13 is a standard condenser and 14 is the indicator which in the present case may be a telephone receiver; 15 is the alternating current source which may preferably be a fixed frequency audio oscillator; 16, 17, 18 and 19 are the four branch points of this circuit which is grounded at 17. To obtain balance, i. e. silence in the telephone, the condenser 12 is varied and if necessary the resistor 10 whereupon the unknown capacity C may be found from the following equation:

$$C=C'S/Q \qquad (3)$$

Where C is the capacity of the unknown condenser 8, C' is the capacity of the standard condenser 13, S is the resistance 11, and Q is the resistance 10. In using this circuit for determining the properties of a certain mixture the bridge is first balanced with the condenser empty and the capacity C found from Formula (3). The fluid mixture to be tested is next injected into the condenser and the bridge again balanced. The new value of C is noted and according to the type of condenser used the dielectric constant is found from Formulas (1) or (2). The remaining step is then to determine the actual percentage from a calibration chart similar to Fig. 3 made by quantitative measurements. This method, although extremely accurate, is only suitable for laboratory use.

Figure 5:
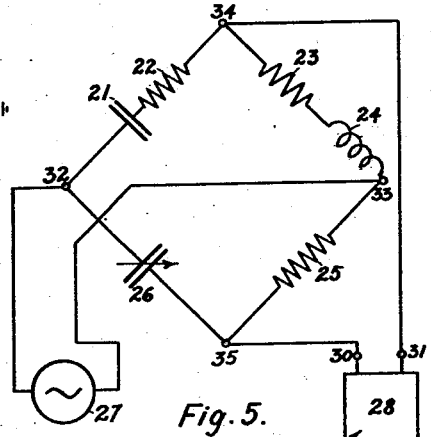
Fig. 5 is a schematic diagram of a special bridge circuit suitable for the measurement and direct indication and recording of capacitance.

In Fig. 5 is shown the schematic diagram of a modified bridge circuit suitable for direct reading and recording of properties of solutions. In this bridge 21 is the condenser to be measured, 22 the series resistance in branch 32 to 34, 23 the series resistance in branch 33 to 34 and 24 an inductance; 25 is the resistance between points 33 and 35 and 26 is a variable standard condenser; 27 is a suitable high frequency source, 28 is an amplifier and 29 may be a combined indicator and recorder or just the indicator. This indicator may be either a vacuum tube voltmeter, a thermocouple microammeter or a simple copper-oxide rectifier type output meter. The recorder may be any one of a number of different types now on the market capable of giving a continuous record of changes in E. M. F. When the bridge is balanced the indicator shows zero E. M. F. or zero current. This point may therefore serve as a reference point in the calibration of the scale for a certain liquid. In a practical application, for instance for beer, this reference point may be located in the center of the scale and read the nominal 3.2% which the correct beer shall have. Any slight change in the alcoholic content will cause a slight unbalance and the indicator needle will move to one or the other side of the nominal value. The scale may thus be calibrated to read directly in per cent and a glance at the meter is sufficient to tell whether or not the alcoholic content is inside of the prescribed limits. By the use of photo-electric or mechanical contact making relays the indicator or recorder may in known way be made to give signals, of an audible or visible nature, when the alcoholic content exceeds certain limits.

Figure 6:
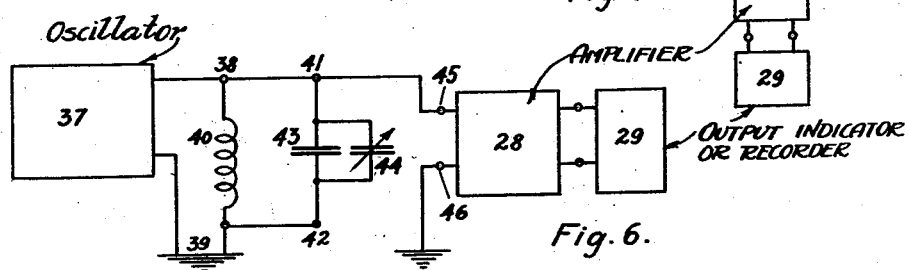
Fig. 6 is a schematic diagram of a resonance method suitable for the measurement, direct indication and recording of alcoholic content in a watery solution in terms of capacitance.

In Fig. 6 is shown a resonance method for accomplishing the same as described for the hookup of Fig. 5. In this diagram 37 is a radio frequency source of known and steady characteristics, one terminal of this source is connected to ground at 39 while the other 38 is connected to a resonance circuit consisting of the induction coil 40 connected in parallel through 41 and 42 to the test condenser 43, in parallel with 43 is placed a variable standard condenser 44. The resonance circuit is also connected to ground at 39 and from 41 it is connected to the terminal 45 of the amplifier 28, the other terminal 46 of which is connected to ground. The output terminals of the amplifier are connected to the indicator 29 which may be similar to the one described in Fig. 5. The operation of this method is somewhat similar to that described for Fig. 5. The resonant circuit is adjusted to resonance by setting the adjustable condenser 44. This point will then be the reference point which may be calibrated with a standard solution. On the indicator this will be the point of maximum current due to the fact that at resonance the oscillating circuit has maximum impedance and the loss caused by it is zero, in other words the reference point will be the reading of the full output of the oscillator 37. As changes in the measured liquid occur there will be a large loss due to the current flowing through the reduced impedance of the oscillating circuit, the indicator will thus show a rapidly falling current the indications of which may be directly calibrated in per cent alcoholic content. Due to the well known fact that resonance for a resistanceless circuit is extremely sharp a small change in capacitance of the measuring condenser will cause a large change in the indicator current. Extreme accuracy may thus be obtained over a small range, which may be necessary as for instance in the manufacture of beer where the permissible limits are only a few tenths of one per cent. It is also well known that by introducing resistance into the oscillating circuit the resonance may be flattened out in any desirable manner, thus increasing the range of readings. This method is also suited for recording as described for Fig. 5.

As there are literally hundreds of bridge and oscillating circuits suitable for the present type of measurements I have only shown three of the most typical and suitable modifications. It is obvious, therefore, that one skilled in the art may modify these circuits and measuring technique to a large extent without in any way deviating from the principle of my invention.

Figure 7:
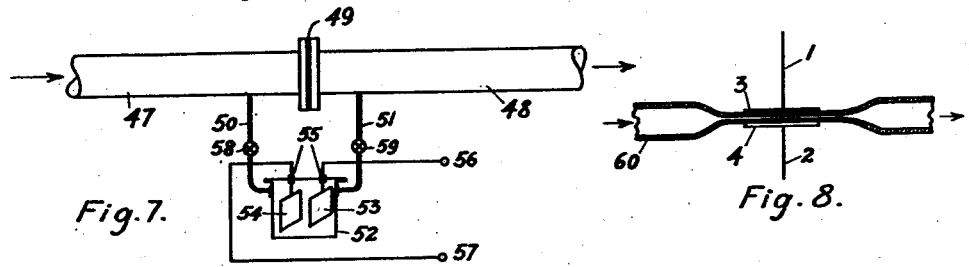
Fig. 7 is a schematic diagram of the mechanical arrangement for the continuous measurement of a liquid flowing through a pipe.

In Fig. 7 is shown schematically the mechanical pipe arrangement for the measurement of a continuous flow of liquid. The main pipe is cut in two sections 47 and 48 which are joined with flanges between which there is placed a diaphragm 49 with a suitable aperture to, in known way, cause a pressure difference. Due to this pressure difference there will flow a stream of fluid through the small tube 50 connected to the container 52. When this container 52 is full the excess will flow off through tube 51 and go back into the main pipe 48. This diverted flow may be further regulated with the hand-operated valves 58 and 59. The container 52 contains the measuring condenser which is shown schematically as two parallel square plates 53 and 54, the electrical connections from these plates are carried through insulators 55 to the terminals 56 and 57 which in turn may be connected to a bridge or resonance circuit as shown in Figs. 4, 5 and 6.

Figure 8:
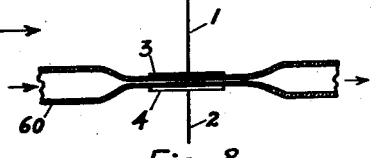
Fig. 8 is a schematic diagram of the simplest form of an insulated measuring condenser.

In Fig. 8 is shown the simplest method of making an insulated condenser for the present purpose. Here is 1 and 2 the electrical conductors, 3 and 4 the two condenser plates similarly as shown in Figs. 1 and 2, a glass tube 60 has a flattened section at one point where the condenser plates 3 and 4 are placed closely touching the glass. This arrangement is electrically identical to that shown in Fig. 2, the walls of the glass tube being the dielectrics 6 and 7 while the fluid flowing in the glass tube corresponds to the dielectric 5.

In Fig. 9 is shown the actual pipe arrangement for a preferred design embodying my invention. The intake from the main pipe may be similar as shown in Fig. 7 with connecting tubes 50 and 51 leading to the measuring condenser, 58 and 59 being the hand valves for regulating the flow. The measuring condenser consists mainly of a glass tube 62 being coated on the outside, for part of its length from 63 to 64, with tinfoil or other conducting metallic substance. At one point 65 a conductor 66 is connected to the metallic coating, this being one of the terminals leading to the measuring apparatus. The other terminal being a conductor 67 connected to the metal flange of the pipe, this point may also be grounded. The flanges 71 and 72 connect the glass tube with the tubes 50 and 51.

In Figs. 10 and 11 is shown in detail the inside construction of the measuring condenser 62, Fig. 10 being a section through one end of same, while Fig. 11 is an elevation of one of the end flanges. Inside the glass tube 62 and concentrically with same is located a metallic body 73 supported at both ends through a thin streamlined metallic strip 74, the latter resting in slots in the flanges 71 and 72. These strips 74 may be riveted, soldered or welded both to the body 73 and to the flanges 71 and 72 thus making a good electrical connection from the body 73 which forms the second plate of the measuring condenser. This body 73 is rounded at each end in streamlined fashion to offer a minimum of resistance against the flow of the liquid and to secure a flow without turbulence. A turbulent flow would make measurement impossible due to the appearance of air or other gases in the measuring condenser. In Fig. 10 is also shown how the glass tube 62 is cemented into the flanges 71 and 72 with a suitable adhesive cement 75. It is further shown how the outside conducting covering from 63 to 64 is purposely placed at a distance from the flanges 71 and 72 leaving on each side a section of transparent glass tube where one may observe the flow and adjust the valves 58 and 59 until a smooth non-turbulent flow is obtained. There are several good reasons why a condenser of this type is preferable over other designs. This type of condenser has electrical properties calculable with great accuracy for calibration purposes, it is easily manufactured with precision and it is free from difficulties due to corrosion, turbulence, etc., as mentioned above. Other types of condensers may, however, be employed by one skilled in the art without deviating from the principle of my invention.

In Fig. 12 is shown a laboratory type of condenser consisting of a glass tube 76 having outside metallic cover 77, and an inside concentrically located metallic body 78. Conductors are connected at 79 and 80 leading to terminals 81 and 82 where the measuring apparatus may be connected. The entire condenser is supported in a regular laboratory stand 83. At its upper end the glass tube 76 has a branch 84 for filling and at its lower end a stop cock 85 for emptying. This condenser is suitable for use in testing samples as well as for calibration of instruments with standard solutions. For the latter purpose it may be made with exactly identical dimensions and characteristics as the condenser used for continuous flow.

The detailed description of the operation of my invention has been given above, it may only be mentioned that in general its application will be as follows: In a brewery, for instance, instruments may be installed on the brewmaster's desk indicating at a glance the condition of the several beverage products being produced. As mentioned above automatic recorders may also be added in every instance giving a valuable record of the quality of the products manufactured. Similarly my invention may be applied in distilleries, refineries and other manufacturing plants for a number of valuable process controlling objects as mentioned above.

Having thus described my invention what I claim is:

1. Apparatus for measuring the proportionate quantities of the components of a mixture of two liquids comprising means for utilizing the mixture as the dielectric of a condenser, insulating means preventing aberrations due to the conductivity of the mixture, electrical means for measuring the specific inductive capacity of the mixture, and means for directly converting the results into percentages.

2. Apparatus for measuring the proportionate quantities of the components of a mixture of two liquids comprising means for utilizing a continuous flow of the mixture as the dielectric of a condenser, insulating means preventing aberrations due to the conductivity of the mixture, electrical means for measuring the capacity of said condenser, and means for directly converting the results into percentages.

3. Apparatus for measuring the proportionate quantities of the components of a mixture of a plurality of liquids comprising a condenser, means for diverting a continuous flow of the mixture between the plates of said condenser, means for securing a non-turbulent flow between said condenser plates, insulating means disposed between at least one of said condenser plates and the liquid, electrical means for measuring and indicating the instantaneous value of the capacity of said condenser, and calibrated means for converting said capacity readings into percentages.

4. In an electric hydrometer such as described in claim 1 where said condenser comprises an insulating tube with metallic flanges for connecting to inlet and outlet pipes; a cylindrical body, forming one plate of said condenser, and concentrically disposed inside of said insulating tube; metallic conducting and supporting means at each end of said cylindrical body; said supporting means furnishing contact between said cylindrical body and said metallic flanges; an electrically conducting covering on the outside of said insulating tube, said conducting covering encasing said insulating tube except for a bare portion toward each end and forming the second plate of said condenser, and terminal means for connecting said condenser plates in a circuit.

5. In an electric hydrometer of the character described, a standard tubular condenser, a suitable non-corrodible electrical insulation covering one electrode of said tubular condenser, a continuous non-turbulent flow of a mixed two-component liquid flowing between the electrodes of said tubular condenser, an A. C. bridge comprising a constant frequency generator and an indicator calibrated to give a visual indication whenever the properties of the said liquid are at variance with a certain given reference point.

MAGNUS BJÖRNDAL.